J. L. GRAY.
APPARATUS FOR RECOVERING LIGHT OILS FROM NATURAL GAS.
APPLICATION FILED DEC. 14, 1907.

933,976.

Patented Sept. 14, 1909.

Attest:
L. J. Browning
E. Wicks

Inventor:
John Lathrop Gray
by Edward C. Davidsat Atty

UNITED STATES PATENT OFFICE.

JOHN LATHROP GRAY, OF ELIZABETH, NEW JERSEY.

APPARATUS FOR RECOVERING LIGHT OILS FROM NATURAL GAS.

933,976.  Specification of Letters Patent.  Patented Sept. 14, 1909.

Application filed December 14, 1907. Serial No. 406,437.

*To all whom it may concern:*

Be it known that I, JOHN LATHROP GRAY, a citizen of the United States of America, residing in Elizabeth, county of Union, State of New Jersey, have invented a certain new and useful Apparatus for Recovering Light Oils from Natural Gas, of which the following is a specification.

Natural gas delivered at oil wells, frequently carries a volume of light oils, particularly gasolene, and attempts, which have met with some success, have been made to separate and recover the gasolene.

This invention comprises a new organization of apparatus for such purpose. It has been demonstrated that by its employment substantially all of the light oil or gasolene may readily be separated from the gas.

Figure 1:
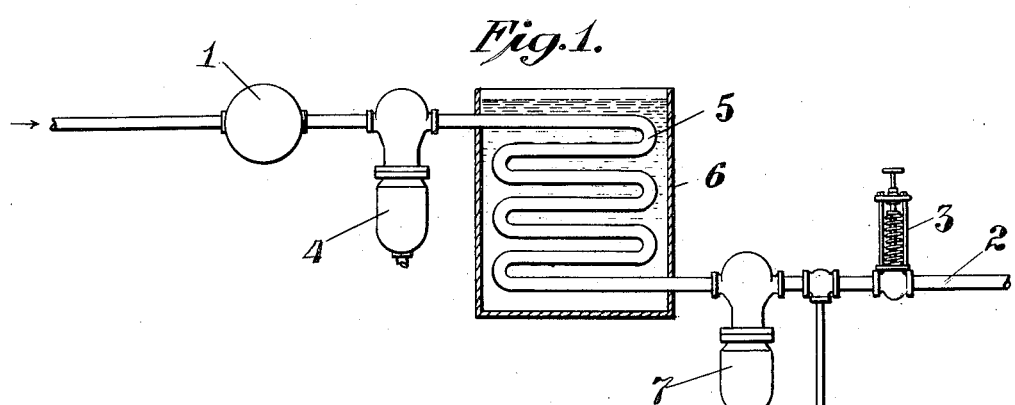
Figure 2:
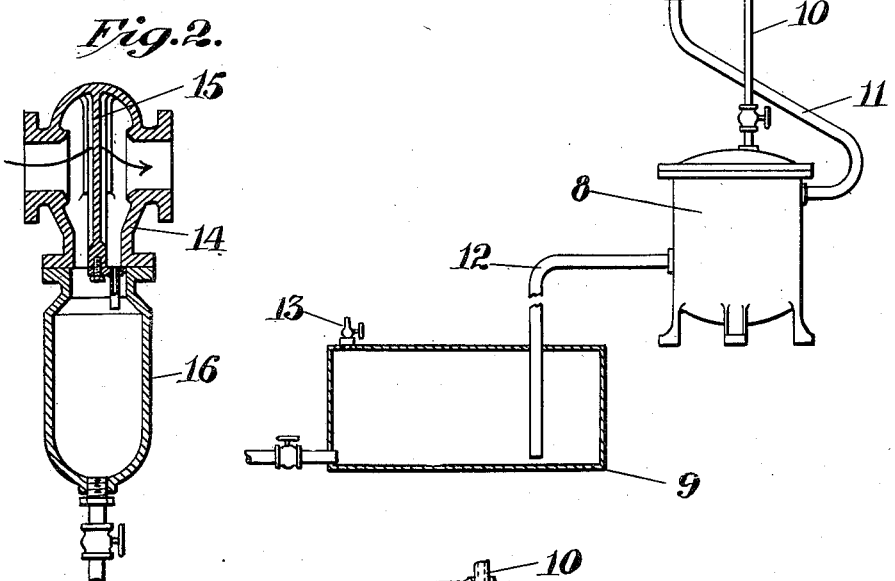
Figure 3:
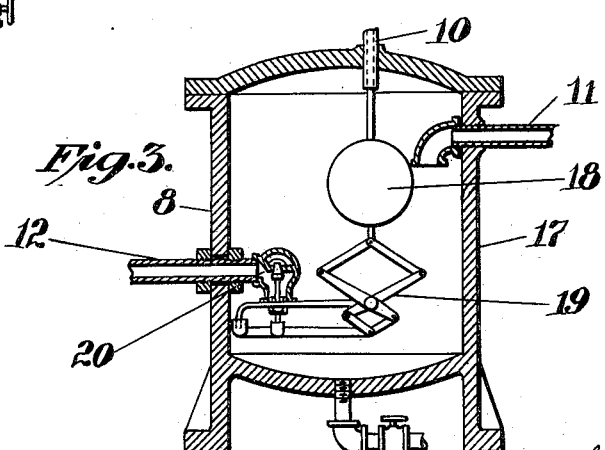

In the accompanying drawing: Figure 1 is a diagrammatic view: Fig. 2, a vertical section through a well known form of device for separating liquid from a gas—such as water from steam: and Fig. 3, a similar view of a well known form of liquid trap.

The gas is delivered by a compressor 1 to a pipe system between which and the pipe 2 that may deliver the gas to a suitable holder, is placed a relief valve 3 of ordinary construction serving to maintain a desired pressure in the pipe system between it and the pump or compressor.

4 is a separator of ordinary construction, 5 a condensing or cooling coil inclosed in a water tank 6 that may be continuously supplied with water. 7 is a second separator, 8 a liquid trap and 9 a receiving tank for the separated and condensed gasolene. Gas delivered by the compressor passes through the separator 4 to the cooling coil, thence to the second separator 7, and thence past the relief valve 3 to the gas delivery pipe 2. Between the separator and the relief valve there is a pipe connection 10 running from the top of the trap to the gas pipe. The function of the first separator 1 is to separate or remove from the gas, such lubricating oil as may be carried by the gas from the compressor. In the cooling coil, the gasolene is condensed and the separator 7 serves to collect it and deliver it by pipe 11 to trap 8 from whence it is discharged by pipe 12 to the receiving tank 9 which may be provided with a vent 13. Under the pressure and temperature employed, there is substantially complete separation of the gasolene from the gas and delivery of the former to the trap 8. The vent pipe 10 performs the function of delivering to the gas pipe beyond the separator 7 any gas that may be carried into the trap thereby preventing the trap from becoming gas bound.

The separators shown each comprise a shell 14 with inlet and outlet ports and an intermediate diaphragm having fluted or corrugated front and rear surfaces closing the passage way for the gas except at one side of the diaphragm. Below the casing 14 is a receiver 16 for separated liquid. The trap comprises a shell 17, a float 18, the upper end of the stem of which may be guided in the lower end of pipe 10. The lower end of the stem is connected with a lazy-tongs device that controls the opening and closing of valve 20. The general construction of the trap is well known. Owing, however, to the gasolene being of low specific gravity, the trap should be adapted to it. Either the ball float should be increased in diameter or the outlet port of the valve be reduced—as compared with what would be required for a heavier liquid—such as water.

I claim:

1. In apparatus for separating light oils from gas, a pipe system having at one end a compressor for forcing gas thereinto, a relief valve at the other end opposing a substantially uniform resistance to the compressed gas, a condenser intermediate such two parts, a separator intermediate the condenser and the relief valve, an oil discharge pipe leading from the separator, and an outlet leading from the relief valve adapted to convey the gas to a place of storage or use.

2. In apparatus for separating light oils from natural gas, a pipe system having a compressor at one end and a relief valve at the other and comprising a condenser intermediate such two parts, a separator intermediate the condenser and the relief valve, a closed liquid trap, a connection between it and the separator, and a receiver for the oil, and a connection between it and the trap.

3. In apparatus for separating light oils from natural gas, a pipe system having a compressor for delivering the gas at one end thereof, a relief valve at the other end, a condenser intermediate such two parts, a separator between the condenser and the relief valve, a closed liquid trap that receives liquid from the separator and has a discharge valve controlled by the fluid in the trap, and a pipe connecting the top of the trap with the pipe system at a point between the separator and the relief valve.

4. Apparatus for separating light oils from natural gas, comprising a pipe system having a gas delivery compressor at one end and a relief valve at the other, a condenser intermediate such two parts, a separator intermediate the compressor and the condenser, a second separator intermediate the condenser and the relief valve, a closed liquid trap to which the second separator delivers condensed oil and a pipe connecting the upper part of the trap with the pipe system between said second separator and the relief valve.

In testimony whereof, I have hereunto subscribed my name.

JOHN LATHROP GRAY.

Witnesses:
FRANK E. HOLSTEN,
HARRIET TYREG GRAY.